United States Patent
De Coi

(10) Patent No.: US 9,805,455 B2
(45) Date of Patent: Oct. 31, 2017

(54) ROTARY ENCODER SYSTEM

(71) Applicant: ESPROS Photonics AG, Sargans (CH)

(72) Inventor: Beat De Coi, Sargans (CH)

(73) Assignee: Espros Photonics AG, Sargans (CH)

( * ) Notice: Subject to any disclaimer, the term of this patent is extended or adjusted under 35 U.S.C. 154(b) by 116 days.

(21) Appl. No.: 14/942,140

(22) Filed: Nov. 16, 2015

(65) Prior Publication Data
US 2016/0140705 A1   May 19, 2016

(30) Foreign Application Priority Data
Nov. 18, 2014 (EP) .................................... 14193626

(51) Int. Cl.
| | | |
|---|---|---|
| *G06K 9/00* | (2006.01) | |
| *G06T 7/00* | (2017.01) | |
| *G01P 3/38* | (2006.01) | |
| *G01D 5/347* | (2006.01) | |
| *G01D 5/36* | (2006.01) | |

(52) U.S. Cl.
CPC ......... *G06T 7/0004* (2013.01); *G01D 5/3473* (2013.01); *G01D 5/36* (2013.01); *G01P 3/38* (2013.01); *G06T 2207/30164* (2013.01)

(58) Field of Classification Search
CPC ............. G01D 5/3473; G01D 5/36; G06T 2207/30164; G06T 7/0004; G01P 3/38; G01P 3/68
USPC ................................................. 382/141, 232
See application file for complete search history.

(56) References Cited

U.S. PATENT DOCUMENTS

| 5,359,434 A * | 10/1994 | Nakao ................ G06K 15/1219 |
| | | 347/132 |
| 6,909,516 B1 * | 6/2005 | Hoover .................. G01D 5/347 |
| | | 347/116 |
| 7,589,313 B2 * | 9/2009 | Nordenfelt ......... G01D 5/34707 |
| | | 250/231.13 |
| 9,423,281 B2 * | 8/2016 | Agrawal .............. G01D 5/2455 |
| 2007/0201929 A1 * | 8/2007 | Igarashi ................. B41J 19/207 |
| | | 400/322 |
| 2008/0117414 A1 * | 5/2008 | Hollander ................ G01D 5/26 |
| | | 356/139.09 |

FOREIGN PATENT DOCUMENTS

| EP | 2 700 911 A1 | 2/2014 |
| WO | 2004/094957 A1 | 11/2004 |
| WO | 2013/174707 A1 | 11/2013 |

* cited by examiner

*Primary Examiner* — Kanjibhai Patel
(74) *Attorney, Agent, or Firm* — Burr & Brown, PLLC

(57) ABSTRACT

A rotary encoder system for registering the rotary angle position and/or angular speed of a rotary shaft which extends along an axis of rotation, including at least two optical marks at the rotary shaft, an optical sensor with a pixel matrix having pixel points, an imaging device for imaging each mark in a substantially axial direction on the pixel matrix as a mark image, and an evaluation device for reading and evaluating the pixel matrix in order to determine data in relation to the rotary angle position and/or angular speed. Further, the marks, the imaging device and pixel points are embodied in such a way that the mark images on the pixel matrix have at least the area of a pixel point, and the evaluation device is embodied to establish the location of the centroids of the mark images on the pixel matrix.

20 Claims, 1 Drawing Sheet

ROTARY ENCODER SYSTEM

This application claims the benefit under 35 USC §119 (a)-(d) of European Application No. 14193626.0 filed Nov. 18, 2014, the entirety of which is incorporated herein by reference.

FIELD OF THE INVENTION

The present invention relates to a rotary encoder system for registering the rotary angle position of a rotary shaft rotating about an axis of rotation.

BACKGROUND OF THE INVENTION

The prior art has disclosed rotary encoder systems which track a mark on the rotary shaft by optical means.

SUMMARY OF THE INVENTION

It is an object of the present invention to provide an improved rotary encoder system.

The rotary encoder system according to the present invention is a rotary encoder system for registering the rotary angle position and/or angular speed of a rotary shaft which extends along an axis of rotation, comprising at least two optical marks at the rotary shaft, an optical sensor with a pixel matrix having pixel points, an imaging device for imaging each mark in a substantially axial direction on the pixel matrix as a mark image, and an evaluation device for reading and evaluating the pixel matrix in order to determine data in relation to the rotary angle position and/or angular speed, wherein the marks, the imaging device and pixel points are embodied in such a way that the mark images on the pixel matrix have at least the area of a pixel point, wherein the evaluation device is embodied to establish the location of the centroids of the mark images on the pixel matrix. In particular, the centroids of the mark images on the pixel matrix can be established with sub-matrix classification.

The size of the pixel points, the area of the marks and the imaging device are matched to one another in such a way that the above-described minimum area forms on the pixel matrix by way of the mark images.

Substantially axial imaging means that the imaging is carried out substantially along the extension of the rotary shaft, with an angle of observation in relation to the axis of rotation being in particular less than 45°, in particular less than 10°, in particular less than 2°, in particular 0°.

Pixel matrix means the maximum field of the pixel matrix which should be evaluated. Rows or columns not used for readout and/or evaluation on principle do not count as part of the pixel matrix of the invention.

For a mark image, area means the value for the magnitude of the overall area thereof. For a pixel point, area means the value for the magnitude of the area of the rectangle spanned by the area centroids of 4 directly adjoining pixel points.

Sub-matrix division means that the location of the centroid is established within the pixel field with a higher resolution than that of the pixel field, in particular with a multiple resolution, i.e., for example, with a double, four-fold or eight-fold resolution. This can be achieved by virtue of the partial coverage of a pixel point by a matrix image being detected by the restricted change in brightness caused thereby. In particular, each mark can be dark, in particular black, while the background of the marks is bright, in particular white, light gray or silver. In particular, the evaluation device can be embodied to establish the location of the centroids of the individual mark images on the pixel matrix by evaluating partial coverage of adjacent pixel points by mark images, in particular by determining the grayscale values of the at least partly covered pixel points and by subsequently weighting these pixel points.

In the case of a predetermined angle resolution, the sub-matrix evaluation of the centroids of the mark images enables the use of the pixel matrix with a restricted size. This use of a pixel matrix with a restricted size can be advantageous in that the data rate can be reduced and the pixel matrix can be read out more quickly, and hence a higher measurement repetition rate can be provided, wherein the angular accuracy is reduced. The data rate grows with the square of the rows of the pixel matrix. It was found that a sufficiently quick evaluation of a pixel matrix, or of regions with a number corresponding to more than 128×128 pixel points, is no longer possible in a meaningful way in certain circumstances. Under certain circumstances, a very good balance between read speed and angle resolution can be obtained with a 64×64 pixel array. In the case of a 16×16 pixel array, an angle resolution of ±0.5° with a very quick readout can be still achieved after all under certain circumstances.

In particular, the evaluation device can be embodied to read and evaluate the pixel matrix at constant time intervals. These constant time intervals can form the repetition rate of a rotary encoder system for renewed reproduction of a measurement value. Pixel images from different times can be an intermediate result of the readout which is constant in time.

Preferably, the rotary encoder system and the evaluation device can be embodied to provide a repetition rate of more than 1000 hertz (measurement values per second) or more than 10 000 hertz or more than 100 000 hertz.

The optical acquisition of the marks can be advantageous in that the angle detection can be carried out in a contactless manner and/or it can also take place in a manner separated in space through a glass separation and/or it can take place over comparatively long distances of e.g. at least 10, 100, 1000, 10 000 or 100 000 times the mark spacing, e.g. by means of a telephoto lens.

The use of at least 2 marks can be advantageous in that the detection is robust in relation to vibrations of the shaft and/or in relation to non-centered imaging.

Preferably, the mark images have at most 100 times, in particular at most 64 times, in particular at most 36 times, in particular at most 16 times, in particular at most 4 times, in particular at most one time the area of a pixel point.

This restriction of the size of the mark images on the pixel matrix can permit a reduction in the pixel matrix and/or a reduction in the portions to be read out on the pixel matrix, without the angle resolution being reduced to the same extent. The relationship between angle resolution and repetition rate can thus be optimized.

Preferably, the mark images have at least 1 time, in particular 2 times, in particular at least 4 times, in particular at least 16 times the area of a pixel point.

This can be advantageous in that more pixel points can be used to calculate the centroids, and so the evaluation becomes more exact.

Preferably, the pixel matrix has at most 128×128 pixel points, in particular at most 64×64 pixel points, in particular at most 32×32 pixel points, in particular at most 16×16 pixel points, in particular at most 8×8 pixel points.

This may be sufficient to provide a sufficiently high angle resolution and be advantageous in further increasing the read speed and hence the measurement repetition rate of the invention.

A pixel matrix of at most N×N pixel points denotes a pixel matrix with N×N points or a larger pixel matrix, of which only a region of N×N is read out.

Preferably, the evaluation device is embodied to read and/or evaluate at most a number corresponding to 128×128 pixel points, in particular at most corresponding to 64×64, in particular at most corresponding to 32×32, in particular at most corresponding to 16×16, in particular at most corresponding to 8×8, in particular at most corresponding to 4×4, in particular at most corresponding to 2×2.

The remaining pixel points of the pixel matrix are not read and/or evaluated and therefore do not pointlessly cause a deterioration in the repetition rate. This may be sufficient to provide a sufficiently high angle resolution and be advantageous in that the read speed and hence the measurement repetition rate of the invention are increased further.

Preferably, each mark is arranged on an imagined or real surface at an angle to the axis of rotation, in particular on a surface perpendicular to the axis of rotation, in particular on an end surface of the axis of rotation. This can be advantageous in that the imaging becomes simple.

Preferably, each mark is an optical mark with a brightness or color difference in the visible spectrum and/or in the IR spectrum and/or in the UV spectrum in relation to the background. In particular, the marks can be dark, in particular black, while the background of the marks is bright, in particular white, light gray or silver. Preferably, the pixel matrix and the imaging device are accordingly active in the same optical spectrum. This can simplify the simple imaging and detection of the marks.

Preferably, each mark has a filled round form. This can simplify the evaluation of the partial coverage of the pixel points by mark images and/or the interpolation of the centroids.

A circular line-shaped form of a mark, centric in relation to the axis of rotation, is also feasible.

Preferably, the marks are formed by adjacent surfaces with complementary colors, in particular by a white and a black semicircular surface, which combine to form a circular surface substantially concentric with the axis of rotation.

Preferably, exactly 2 marks are present. This can be advantageous in that the angle movement can be tracked with little evaluation outlay and with a high repetition rate.

Preferably, at least two marks have a different size and/or form of the areas thereof. This can be advantageous in that a unique determination of the current angle is possible at all times.

Preferably, at least or exactly 3 marks are present. This can be advantageous in that a unique determination of the current angle is possible at all times.

Preferably, when used, the at least 3 marks are not all arranged at the same angular distance from one another around the axis of rotation. This can be advantageous in that a unique determination of the current angle is possible at all times.

Preferably, each mark has the same distance from the axis of rotation. This can be advantageous in that a maximum angle resolution is achieved.

Preferably, the marks are arranged with radial symmetry in relation to the axis of rotation. This can be advantageous in that a maximum angle resolution is achieved.

Preferably, the evaluation device is embodied to establish the location of the centroids of the mark images on the pixel matrix by evaluating partial coverage of pixel points by mark images, in particular by evaluating grayscale values of the pixel points depicting a mark image, in particular by weighting the location of the individual pixel points depicting a mark image on the basis of the respective brightness values thereof.

This can be advantageous in that the location of the centroids can be established in sub-matrix division, as a result of which a smaller number of pixels is required for the same resolution.

In principle, a centroid could be formed by simple averaging of the x-location and y-location of all pixel points contacted by a mark image where the brightness value of said pixel points exceeds a certain threshold. However, the pixel image is expediently recorded as a grayscale value image or color image. As a result, the pixel points contacted by a mark image can be assigned weighting factors which correspond to the change in the brightness value thereof as a result of the mark image. An even more exact determination of the centroid can emerge by averaging the x-location and y-location over all pixel points contacted by a mark image weighted thus.

Preferably, the evaluation device is embodied to generate a measurement value for the rotary angle position and/or rotary angle change and/or angular speed and/or angular acceleration of the rotary shaft from the centroids of the mark images on the pixel matrix, in particular by trigonometry and/or in particular by comparison with the measurement value or the centroids of one or more preceding pixel images.

Preferably, the evaluation device is embodied to determine, from the location of the centroids and/or data in relation to the image extent of the mark images of one or more time-offset pixel images and/or specific data in relation to the rotary angle position and/or angular speed, one or more portions of the pixel matrix, in particular corresponding to the number of marks, within which the mark images for a subsequent pixel image are at least partly expected, and only to evaluate the one or more portions of the pixel matrix for this subsequent pixel image.

This method, also called region of interest, can be advantageous in that the data rate can be further reduced and the repetition rate can be increased and/or the resolution can be increased by a larger number of pixels in the pixel matrix with an approximately constant data rate.

The rotary encoder according to the invention is a rotary encoder for use in a rotary encoder system, as described above, for registering the rotary angle position and/or the angular speed of a rotary shaft, which extends along an axis of rotation, and for imaging at least two optical marks at a rotary shaft, comprising an optical sensor with a pixel matrix having pixel points, comprising an imaging device for imaging each mark in a substantially axial direction on the pixel matrix as a mark image, and comprising an evaluation device for reading and evaluating the pixel matrix in order to determine data in relation to the rotary angle position and/or angular speed, wherein the imaging device and pixel points are embodied in such a way that the mark images on the pixel matrix have at least the area of a pixel point, wherein the pixel matrix and/or the evaluation device can be embodied as described above.

Further features of the invention are specified in the drawings.

The respectively mentioned advantages can also be realized for feature combinations, in the context of which they are not mentioned.

BRIEF DESCRIPTION OF THE DRAWINGS

Exemplary embodiments of the invention are depicted in the drawings and explained in more detail below. Here, the same reference signs in the individual figures denote mutually corresponding elements.

DETAILED DESCRIPTION OF THE INVENTION

Figure 1:
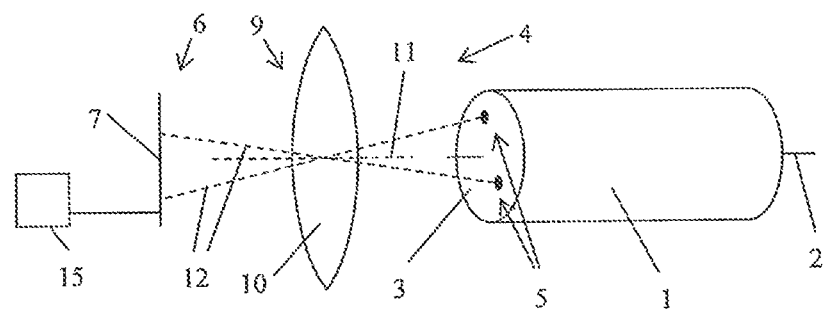
FIG. 1 shows a rotary encoder system with a rotary shaft.

FIG. 1 shows the rotary encoder system 4 with the rotary shaft 1. The rotary shaft is mounted in a manner rotatable about the axis of rotation 2 thereof and has two round black marks 5 on the bright end surface 3 thereof arranged perpendicular to the axis of rotation. The imaging device 9 comprises a lens element 10 which images the marks in the axial direction 11 onto the pixel matrix 7 of the sensor 6, as indicated by the imaging rays 12. The image on the pixel matrix is read and evaluated by the evaluation device 15.

Figure 2:
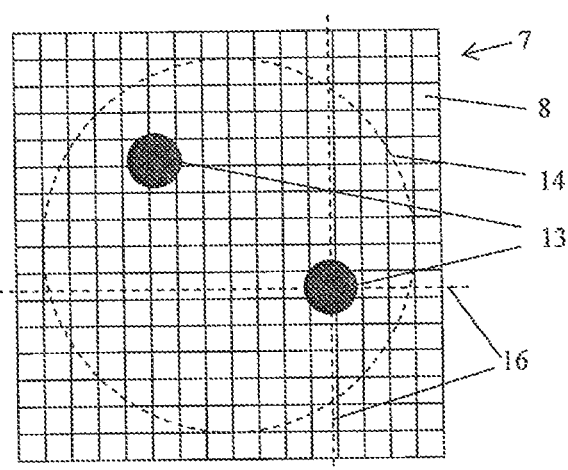
FIG. 2 shows a pixel matrix with mark images.

FIG. 2 shows the pixel matrix 7 with 16×16 pixel points 8. The size of the marks, the imaging device and the size of the pixel points are matched to one another in such a way that the two imaged mark images 13 of the marks are always imaged on the pixel matrix in the case of a rotation of the axis of rotation and that they have approximately 2.5 times the area of a pixel point. The imagined imaged rotary shaft circumference 14 is depicted for illustration purposes.

The partial coverage of the pixel points by the mark images is evaluated as a grayscale value by the evaluation device 15 connected to the pixel matrix and the centroid coordinates 16 of each mark image are calculated from the grayscale values of a plurality of adjacent pixel points as an interpolation method. From the centroid coordinates of the two mark images, the evaluation device calculates an angle value phi for the rotary angle position of the rotary shaft about the axis of rotation thereof according to known trigonometry in accordance with $$phi=\arctan((y1-y2)/(x1-x2))$$

where x1 and y1 are the centroid coordinates of the one mark image and x2 and y2 are the centroid coordinates of the other mark image.

Changes in the rotary angle are accordingly calculated as the difference of the angle value, angular speed is calculated as the difference in the angle value per unit time and angular acceleration is calculated as the difference in the angular speed per unit time.

LIST OF REFERENCE SIGNS

1 Rotary shaft
2 Axis of rotation
3 End surface
4 Rotary encoder, rotary encoder system
5 Optical mark
6 Optical sensor
7 Pixel matrix
8 Pixel point
9 Imaging device
10 Lens element
11 Axial direction
12 Imaging rays
13 Mark image
14 Imaged rotary shaft circumference
15 Evaluation device
16 Centroid line

The invention claimed is:

1. A rotary encoder system for registering the rotary angle position and/or angular speed of a rotary shaft which extends along an axis of rotation, comprising:
   at least two optical marks at the rotary shaft,
   an optical sensor with a pixel matrix having pixel points,
   an imaging device for imaging each mark in a substantially axial direction on the pixel matrix as a mark image, and
   an evaluation device for reading and evaluating the pixel matrix in order to determine data in relation to the rotary angle position and/or angular speed,
   wherein the marks, the imaging device and pixel points are embodied in such a way that the mark images on the pixel matrix have at least the area of a pixel point,
   wherein the evaluation device is embodied to establish the location of the centroids of the mark images on the pixel matrix with sub-matrix division.

2. The rotary encoder system according to claim 1, wherein the marks, the imaging device and pixel points are embodied such that the mark images have at most 100 times the area of a pixel point.

3. The rotary encoder system according to claim 1, wherein the pixel matrix has at most 128×128 pixel points and the evaluation device is embodied to read and evaluate at most a number corresponding to 128×128 pixel points.

4. The rotary encoder system according to claim 1, wherein each mark is arranged on one of a surface at an angle to the axis of rotation, a surface perpendicular to the axis of rotation and an end surface of the axis of rotation.

5. The rotary encoder system according to claim 1, wherein each mark, the pixel matrix and the imaging device are optically effective in the visible spectrum and/or in the IR spectrum and/or in the UV spectrum, such that the mark is formed as a white mark on a black background or vice versa.

6. The rotary encoder system according to claim 1, wherein each mark is round.

7. The rotary encoder system according to claim 1, wherein the marks are formed by adjacent surfaces with complementary colors.

8. The rotary encoder system according to claim 1, wherein exactly 2 marks are present.

9. The rotary encoder system according to claim 1, wherein at least two marks have a different size and/or form of the areas thereof.

10. The rotary encoder system according to claim 1, wherein the marks are arranged at the same distance and/or with radial symmetry in relation to the axis of rotation.

11. The rotary encoder system according to claim 1, wherein the evaluation device is embodied to establish the location of the centroids of the mark images on the pixel matrix by evaluating partial coverage of pixel points by mark images.

12. The rotary encoder system according to claim 1, wherein the evaluation device is embodied to generate a measurement value for the rotary angle position and/or rotary angle change and/or angular speed and/or angular acceleration of the rotary shaft from the centroids of the mark images on the pixel matrix by comparison with the measurement value or the centroids of one or more preceding pixel images.

13. The rotary encoder system according to claim 1, wherein the evaluation device is embodied to determine, from the location of the centroids and/or data in relation to the image extent of the mark images of one or more time-offset pixel images and/or specific data in relation to the rotary angle position and/or angular speed, one or more portions of the pixel matrix corresponding to the number of marks, within which the mark images for a subsequent pixel image are at least partly expected, and only to evaluate the one or more portions of the pixel matrix for this subsequent pixel image.

14. A rotary encoder for use in a rotary encoder system for registering the rotary angle position and/or the angular speed of a rotary shaft, which extends along an axis of rotation, and for imaging at least two optical marks at a rotary shaft, comprising an optical sensor with a pixel matrix having pixel points, comprising an imaging device for imaging each mark in a substantially axial direction on the pixel matrix as a mark image, and comprising an evaluation device for reading and evaluating the pixel matrix in order to determine data in relation to the rotary angle position and/or angular speed, wherein the imaging device and pixel points are embodied in such a way that the mark images on the pixel matrix have at least the area of a pixel point, wherein the pixel matrix and/or the evaluation device are embodied according to claim 1.

15. The rotary encoder system according to claim 7, wherein the marks are formed by the adjacent surfaces with a white and a black semicircular surface, which combine to form a circular surface substantially concentric with the axis of rotation.

16. The rotary encoder system according to claim 9, wherein at least 3 marks are present and the at least 3 marks are not all arranged at the same angular distance from one another around the axis of rotation.

17. The rotary encoder system according to claim 16, wherein exactly 3 marks are present.

18. The rotary encoder system according to claim 11, wherein the location of the centroids of the mark images is established by the evaluation device by evaluating grayscale values of the individual pixel points depicting a mark image.

19. The rotary encoder system according to claim 11, wherein the location of the centroids of the mark images is established by the evaluation device by weighting the location of the individual pixel points depicting a mark image on the basis of the respective brightness values thereof.

20. The rotary encoder system according to claim 12, wherein the measurement value is generated by the evaluation device by trigonometry.

* * * * *